United States Patent [19]

Ewing

[11] 4,223,713
[45] Sep. 23, 1980

[54] PNEUMATIC TIRE HAVING STRUCTURAL RIBS

[76] Inventor: Michael D. Ewing, 23051 Aspen Knoll, Diamond Bar, Calif. 91765

[21] Appl. No.: 939,483

[22] Filed: Sep. 5, 1978

[51] Int. Cl.² .......................... B60B 21/10; B60C 5/16
[52] U.S. Cl. ............................ 152/330 RF; 152/379.4; 152/394
[58] Field of Search ............... 301/39 R, 39 T; 152/6, 152/12, 86, 152, 158, 258–260, 278, 280–283, 330 RF, 378, 379.1, 379.2, 381.1, 381.2, 394, 393

[56] References Cited

U.S. PATENT DOCUMENTS

| 968,777 | 8/1910 | Lieb ........................................ 152/158 |
| 1,159,026 | 11/1915 | Hill ........................................ 152/282 |
| 1,160,508 | 11/1915 | Hay ........................................ 152/259 |
| 1,329,215 | 1/1920 | Westergaard ........................ 152/278 |
| 2,844,180 | 7/1958 | Omeron ........................... 152/381.2 X |
| 3,212,548 | 10/1965 | Drazin .................................. 152/158 |
| 3,719,219 | 3/1973 | Horvath et al. ................. 152/152 X |
| 3,844,325 | 10/1974 | Betancourt ................... 152/379.1 X |

Primary Examiner—Charles A. Marmor

Attorney, Agent, or Firm—Roger A. Marrs

[57] ABSTRACT

A vehicle wheel and tire combination is disclosed herein having a wheel with a central hub provided with attachment holes for receiving wheel studs from a driving wheel drum. The periphery of the wheel hub is provided with an outwardly projecting V shaped integral flange or rim supporting a plurality of loops, spokes or braces arranged in spatial relationship about the entire circumference of the wheel hub flange. A rubber or the like tire casing is carried over the plurality of loops or braces and the terminating edges of the tire casing are vulcanized or otherwise bonded to the recepticles provided in flange so as to enclose or encase the spokes. Steel belting is carried on the underside of the tire casing and the opposite sides of the belting are captured in annular recesses adjacent to and parallel with the recepticle holding the casing edge. Bands are employed to retain the belting in the recess and the assembly of casing and belting are vulcanized together. Air is captured between the hub flange and inside surfaces of the tire casing and belting combination so as to provide a soft vehicle tire reinforced by the loops, spokes or braces.

3 Claims, 4 Drawing Figures

FIG. 1
FIG. 2
FIG. 3
FIG. 4
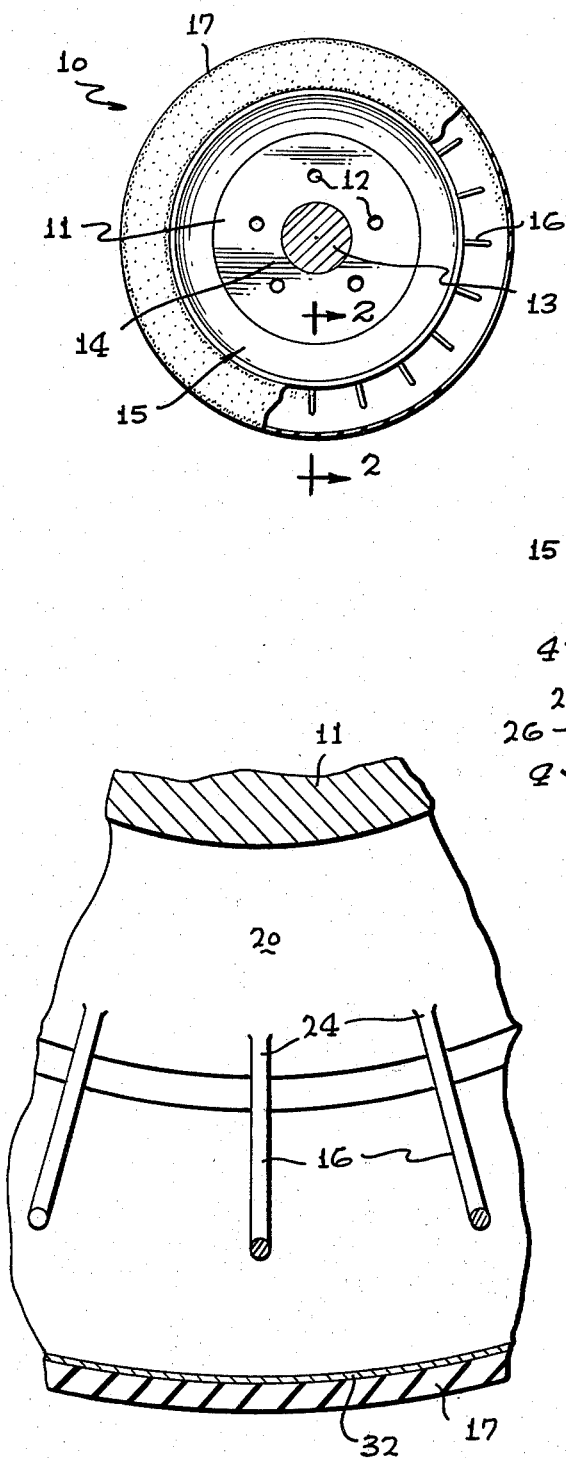
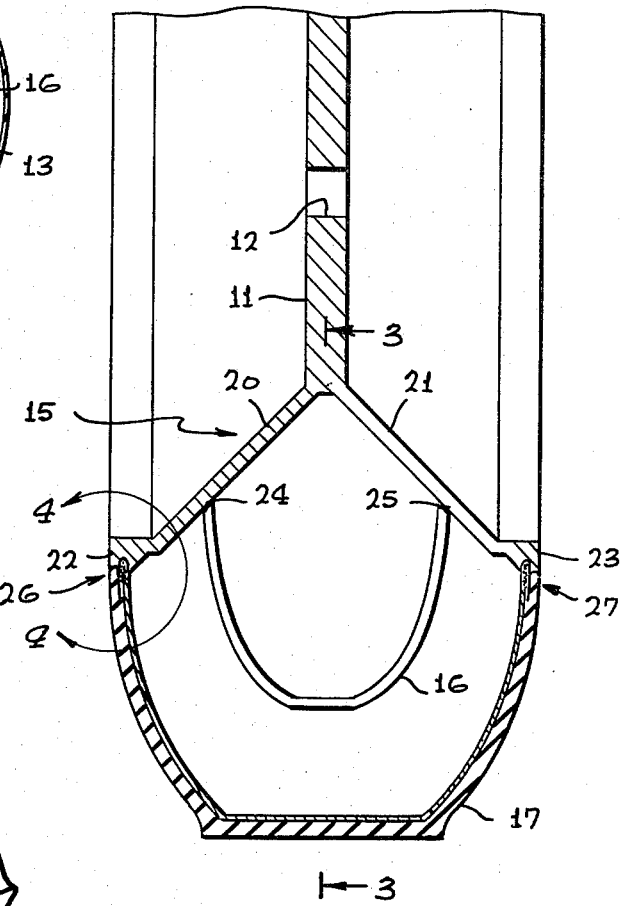
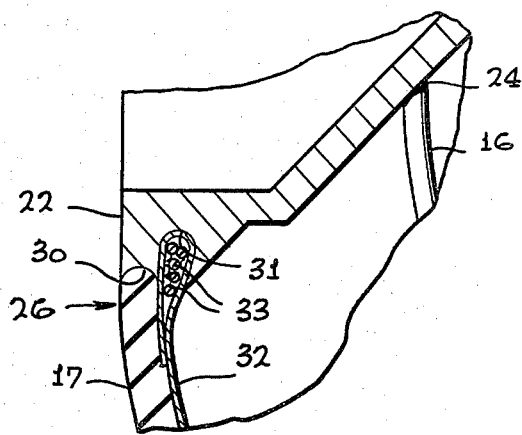

PNEUMATIC TIRE HAVING STRUCTURAL RIBS

BACKGROUND OF THE INVENTION

1. Field of the Invention

This invention relates to a pneumatic vehicle tire and more particularly to a novel vehicle tire having internal structural ribs or braces capped with a rubber tire so as to support a vehicle upon deflation thereof.

2. Brief Description of the Prior Art

In the past, it has been a conventional practice to provide pneumatic or inflatable tires for automobiles or other vehicles which upon accidental deflation failed to support the vehicle. In such an instance, the vehicle is not under control of the operator and substantial damage is caused to the tires, vehicle and possibly to the operator and passengers thereof.

Some attempts have been made to produce pneumatic tires which slowly deflate so that the vehicle is partially supported until the driver or operator can bring the vehicle to a controlled stop. In some instances, a plurality of bladders or inner tubes are provided which deflate in sequence to provide temporary support of the vehicle during the aforementioned efforts of the operator to gain control. Also, pneumatic tires have been substantially reinforced with plastic fibers and/or steel belts or the like in an effort to support the vehicle after deflation of the tire. Some of the tires which have been provided for safety purposes are disclosed in U.S. Pat. Nos. 1,540,414; 1,387,529 and 1,379,843. Although wheels patterned after the inventions disclosed in these letter patents have been successful for some safety purposes, these vehicle wheels are of a solid variety and do not provide for a soft ride for occupants of the vehicle. Also, should the tire fail, the vehicle will lose control and the operator cannot further drive the vehicle without substantial damage to the wheel. In some instances, the tread may separate from the wheel structure which is, of course, undesirable.

Another problem residing with conventional vehicle tires resides in the fact that no warning is given to the vehicle operator upon collapsing or reduction of pressure in the tire. Also, some pneumatic tires will not permit retreading or recapping once the tread has been substantially worn.

Therefore, a long standing need has existed to provide a safety vehicle tire which will provide a warning upon collapse or deflation to the vehicle operator and which will support the vehicle during collapse or reduction of pressure so that the operator may continue to maintain control over the vehicle.

SUMMARY OF THE INVENTION

Accordingly, the above problems and difficulties have been obviated by the present invention which provides a novel pneumatic vehicle tire having a wheel with a central hub or wheel portion provided with a plurality of apertures or holes intended to receive wheel studs for mounting thereon. The periphery of the hub is integrally formed with an outwardly projecting V shaped rim, band or flange for supporting the ends of a plurality of spokes, ribs or loops. Preferably, each of the spokes or loops is integrally formed with the flange by casting, welding or otherwise providing an integral connection therebetween. The plurality of spokes or loops are arranged in fixed spaced apart relationship about the entire circumference of the hub flange or rim and a tire or tread member or casing is carried over all of the spokes or loops by vulcanizing the tire member including its steel belting to opposite sides of the flange. Air is captured within the tire so as to provide a pneumatic ride and support for the vehicle.

Therefore, it is among the primary objects of the present invention to provide a novel vehicle tire having internal supporting means for supporting the vehicle and its occupants during reduction of pneumatic pressure or complete loss thereof during the operation of a vehicle.

Another object of the present invention is to provide a novel vehicle tire offering a soft ride to the vehicle and its occupants but incorporating internal ribs or braces in the form of loops, spokes intended to support the vehicle during partial or full deflation of the tire.

Still a further object of the present invention is to provide an economical vehicle tire which provides safety features and which is economical to manufacture and which may be used by the general public without special assembly or handling.

A further object of the present invention is to provide a novel vehicle tire of the pneumatic variety which will reduce swerving of the vehicle during emergency conditions by providing side load support for the sidewall of the tire.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of the inventive tire and wheel arrangement;

FIG. 2 is an enlarged transverse cross sectional view of the tire and wheel combination as taken in the direction of arrows 2—2 of FIG. 1;

FIG. 3 is a cross sectional view of tire and wheel shown in FIG. 2 as taken in the direction of arrows 3—3 thereof; and FIG. 4 is an enlarged view designed by the circle 4—4.

DESCRIPTION OF PREFERRED EMBODIMENTS

Referring to FIG. 1, the novel pneumatic vehicle tire of the present invention is illustrated in the general direction of arrow 10 which includes a central hub indicated in general by the numeral 11. The hub includes a plurality of openings or holes 12 intended to receive studs from a driving axle hub. The axle is illustrated by numeral 13 as occupying an opening or hole in the hub 11 which is surrounded by a thickened support portion 14. The hub 11 terminates at its periphery with a V shaped rim or flange 15. The flange 15 supports a plurality of outwardly projecting spokes or loops indicated by the numeral 16. The plurality of spokes or loops 16 radiate outwardly from the center of the hub and are integrally formed with the opposite sides of the V shaped rim or flange 15. The vehicle tire 10 is completed by covering all of the spokes or loops with belted tread member 17 having casing sidewalls which are vulcanized or otherwise bonded to the edge marginal region of the flange sides in fixed spaced apart relationship to the spokes or loops 16.

Referring now in detail to FIG. 2, it can be seen that the loops or spokes 16 are integral with the rim or flange 15 and that the flange outwardly projects from opposite sides of the hub 11. One side of the V shaped flange is indicated by numeral 20 and the opposite side of the V shaped flange is indicated by numeral 21. Therefore, it can be seen that the sides 20 and 21 of the flange 15 outwardly project or diverge from a common union with the periphery of the hub 11. The extreme ends of the V shaped flange portions 20 and 21 terminate in thickened portions 22 and 23 which are formed with a pair of annular grooves, to be described later, for retaining the tire member. The spoke or hoop 16 is substantially oval shaped having its opposite ends secured to the flange side or portion 20 and 21 by any suitable means such as welding, casting or the like. The juncture or integral joint is indicated by numeral 24 with respect to flange side 20 and by numeral 25 with respect to the flange side 21.

It can also be seen in FIG. 2 that the opposite sidewalls or ends of the tread member 17 are connected to the thickened portions or members 22 and 23 of the flange and that the tread member is in fixed spaced relationship with respect to the spokes 16. The opposite edges of the tire member sidewall are bonded or vulcanized to the grooves in the flange thickened portions 22 and 23 by any suitable means and the joint or juncture is indicated in general by the numerals 26 and 27 respectively.

Referring now to FIG. 3, it can be seen that the plurality of spokes 16 are arranged in fixed spaced apart relationship on the flange 15 and that they outwardly project in a radiating fashion. It can also be seen in this view that the ends of the respective spokes or loops join with the flange portion mid-way between its length.

Referring now in detail to FIG. 4, it can be seen that the thickened portion 22 is provided with a receptacle 30 for receiving the end of the tire tread 17 and that a similar annular groove 31 is provided in the thickened portion for receiving the end of belting 32. The end of the belting 32 is folded over upon itself and a plurality of bands indicated by numeral 33 are placed into the loop serving as retainers for holding the belting in the annular groove 31. When the tread 17 is vulcanized or molded into the groove 30, a part of the tread will close the loop of the belting 32 so that the bands will remain in place and the entire edge or end of the tread member 17 and 32 will remain in the grooves 30 and 31 in attachment with the thickened portion 22 of the flange 20. Therefore, the tire member including the casing and belting is attached to both flange portions 20 and 21 respectively by vulcanizing or bonding or molding such that air is captured within the tire member 17 to provide a soft ride.

In view of the foregoing, it can be seen that the novel tire of the present invention provides a means for supporting the vehicle in case of deflation or loss of pneumatic support. For example, should air escape from the tire member 17 and the tire collapses, the vehicle will be supported on the plurality of spokes 16 with the weight of the vehicle being distributed into the hub as the wheel turns. Complete load of the vehicle will be via the spokes and into the hub 11. Also, lateral support is provided by the upright spokes as the vehicle is cornering or swerving in an emergency condition. The load in this latter instance is encountered by the spokes and again passed into the hub. The tire member 17 does not bear the load under emergency conditions as is the case with conventional tires.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A safety tire comprising the combination of:

a wheel hub having a central opening for insertably receiving the end of an axle;

said wheel hub further having a plurality of stud receiving openings arranged in a circular pattern coaxial with respect to said central axle opening;

said wheel hub terminating in a circular rim extending outwardly in a diverging manner from opposite sides of said hub circumferential periphery;

spoke means fixed to said rim and radiating outwardly therefrom;

a flexible tire casing bonded to opposite sides of said rim so as to capture air between the interior of said tire and the opposing surface of said rim;

said spoke means includes a plurality of spokes of substantially U-shaped configuration arranged in fixed spaced apart relationship having the opposite ends thereof integrally secured to said rim;

said rim includes a pair of flange portions having one end secured to said hub and the other end projecting outwardly so as to combine to form said rim;

said tire casing includes sides bonded to the free ends of said flange portions with a substantial space separating said spokes from the internal opposing surface of a tread portion joining said tire sides together;

said wheel hub and said rim and said spoke means are integral and constitute a single unitary construction;

said spokes integrally join with said rim mid-way between its opposite ends of said flange portions;

said flange portions include an annular groove for receiving the ends of said tire sides for bonding said tire onto said flange portions and said tire including a reinforcement belting bonded to the inner surface of said tire.

2. The invention as defined in claim 1 wherein:

a plurality of bands are disposed in a closed loop of said belting within said annular groove for retaining said belting in place; and bonding means disposed in said groove and about adjacent and engaging portions of said tire sides and said belting cooperating to retain and attach said tire and belting to said rim.

3. The invention as defined in claim 2 wherein:

said tire casing is of a soft type reinforced by said spoke means to support the tire under load during a condition of deflation.

* * * * *